Patented May 11, 1954

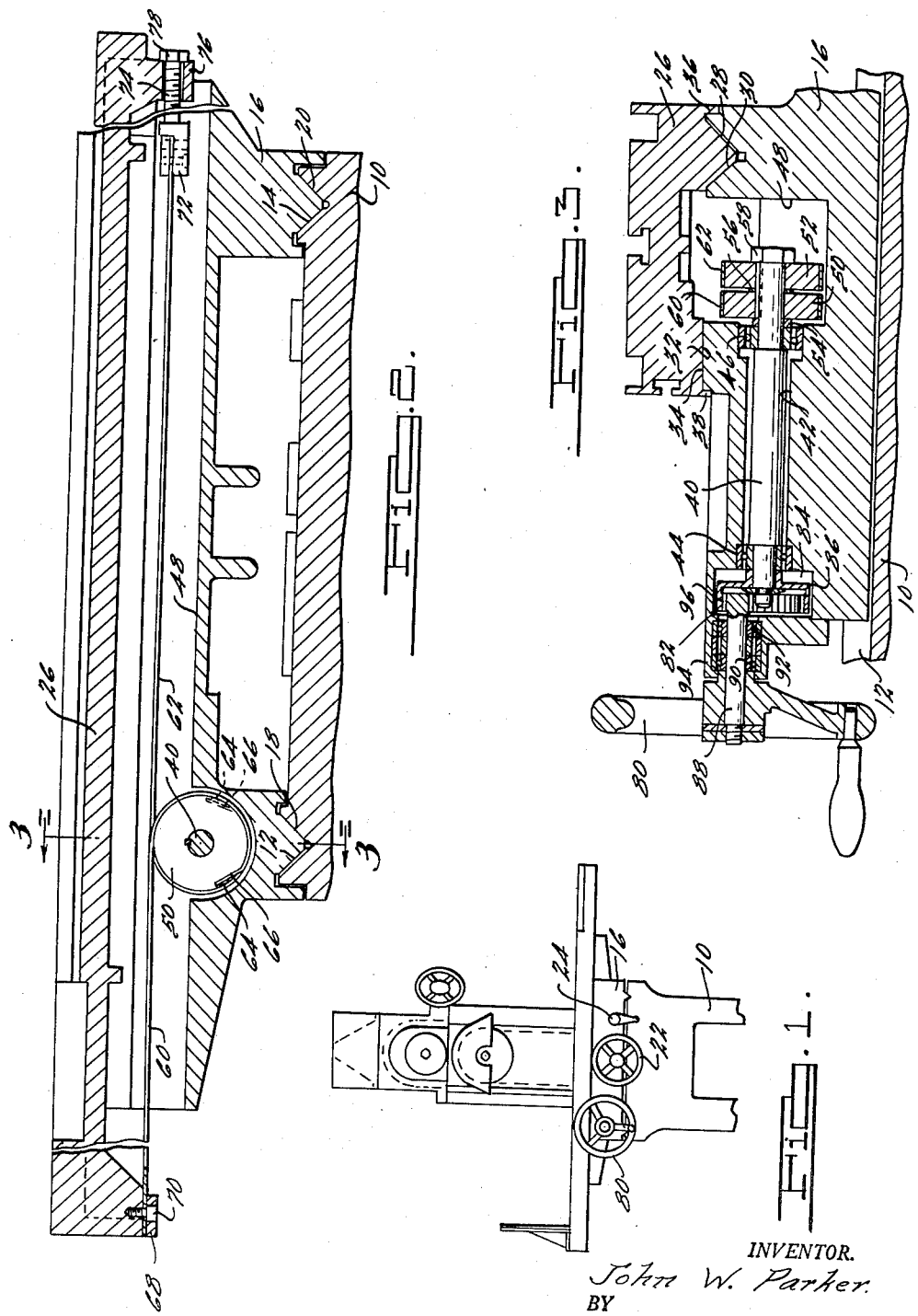

2,677,923

UNITED STATES PATENT OFFICE 2,677,923

TABLE-ACTUATING MEANS FOR SURFACE GRINDERS

John William Parker, Grosse Pointe, Mich.

Application March 15, 1952, Serial No. 276,761

3 Claims. (Cl. 51—231)

This invention relates broadly to new and useful improvements in surface grinders of the type having a saddle mounted on a suitable base for front-to-back sliding movement and a table mounted for sideways reciprocatory movement on the saddle, and more particularly to novel means for actuating the table.

Heretofore, in apparatus of the above-mentioned character, the table has been moved by means of a handwheel through a rack and pinion which interconnects the shaft of the wheel with the table as shown in my prior Patent No. 2,456,079. In the particular construction shown in the patent, the rack is mounted on the underside of the table, and the pinion is fastened to the end of the handwheel shaft in mesh with the rack.

The above construction is fully operative and satisfactory for most purposes, but it has been found unsatisfactory in instances where an extremely smooth finish is required on the work. One of the primary disadvantages of the prior construction is that an extremely fine fit between the pinion and the rack is required in order to assure smooth operation of the table. In the manufacture of the machine the operation of grinding and lapping the rack and pinion absolutely true adds substantially to the cost of the grinder. In addition, a slight dwell occurs in the movement of the table each time a pinion tooth moves into engagement with a rack tooth and this dwell produces a grinding-wheel mark on the work. In other words, the pattern of the gear tooth is reproduced on the workpiece. Moreover, this condition becomes progressively aggravated as wear occurs on the rack and pinion. Still another disadvantage inherent in the prior construction is that the rack and pinion is positioned directly under the table, so that dust and grit created when the machine is in use have ready access thereto, and this results in acceleration of wear on the intermeshing teeth of the parts.

This invention is a reconstruction and rearrangement of the operating parts of the machine so as to eliminate the disadvantages set forth above.

In the drawing forming a part of this specification and wherein like numerals are employed to designate like parts throughout the same, Fig. 1 is a fragmentary front elevational view of a surface-grinding machine of the type to which this invention relates;

Fig. 2 is an enlarged, longitudinal sectional view through the table and subjacent parts of the machine; and Fig. 3 is a fragmentary, vertical sectional view taken on the line 3—3 of Fig. 2.

Reference is now had to the accompanying drawing wherein the numeral 10 designates a supporting base having generally V-shaped ways 12 and 14 at opposite sides and extending from front to back in the top surface thereof. Mounted for fore-and-aft sliding movement on the base 10 is a saddle 16 having runners or guides 18 and 20 which fit and operate in respective ways 12 and 14. Thus, the saddle 16 is reciprocable from front to back on the base 10 and is adjustable relative to the operator who normally stands in front of the machine. The saddle is moved on the base by means of a handwheel 22 and is locked in a selected adjusted position by the handle 24, both of which conveniently may coact with the saddle as disclosed in my prior patent specifically referred to above.

Mounted on the saddle 16 is a worktable 26. Adjacent its rearward edge the table 26 is provided with a depending, substantially V-shaped guide 28 which extends from left to right and slides in a correspondingly shaped guideway 30 provided in the top surface of the saddle 16. The front portion of the table 26 is formed with a flat bottom surface 32 which rests upon and slidably engages a correspondingly flat top surface 34 on the saddle 16. Depending flanges 36 and 38 on the worktable 26 overhang parallel front and back surfaces of the saddle 16 and assist in retaining and guiding the worktable. It will be observed in this connection that the worktable 26 operates in a horizontal plane and in a direction normal or at right angles to the direction of travel of the saddle 16.

According to the present invention, the table 26 is moved back and forth on the saddle 16 by means of a drive shaft 40 which is supported by bearings 44 and 46 in a bore 42 formed in the saddle. As perhaps best shown in Fig. 3, the bore 42 extends rearwardly from the front of the saddle 16 and the rearward terminal portion of the shaft 40 projects into a groove or trough 48 in the top surface and extends entirely across the saddle from one side to the other thereof.

A pair of disks or drums 50 and 52 are keyed or otherwise fixed on the projecting terminal portion of the drive shaft 40. The foremost drum 50 is spaced from the rear bearing 46 by a spacer 54 and the two drums are held apart by a spacer 56. A nut 58 on the end of shaft 40 holds both of the drums 50 and 52 securely thereon. A pair of metal tapes 60 and 62 are fastened to the peripheries of respective drums 50 and 52 and the tapes are wrapped around the drums in opposite directions, as shown in Fig. 2. The attached ends of the tapes may be secured in any desired manner, as by screws 64, and they preferably are indented into the peripheries of the drums, so that the tapes can wrap around the latter without interference from the attaching screws. In Fig. 2 the tape 60 is shown extending to the left of the drum, and the outer end thereof is attached to the corresponding end of table 26 by a clamping bar 68 fastened securely to the table by screws 70. The tape 62, on the other hand, is shown extending from drum 52 to the right-hand end of the table 26, and the distal or outer end of the tape is held securely by a suitable clamping fixture 72. The latter has a threaded stud 74 which extends outwardly through a depending lug 76 on the table 26 and the projecting outer end of the stud 74 receives a nut 78 that can be tightened to vary the tension on the tapes 60 and 62.

From the foregoing, it will be readily apparent that rotation of the drive shaft 40 in a clockwise direction, as viewed in Fig. 2, moves the table 26 to the right, and rotation of the shaft in a counterclockwise direction moves the table to the left. In practice, the table-actuating tapes 60 and 62 are maintained essentially taut at all times by means of the adjustable clamping fixture 72, and with the tapes thus held the table 26 is instantly responsive to rotational movement of the drive shaft 40. There is no lag or lost motion between the shaft 40 and the table 26, and the table can be moved at a continuous, uniform rate, eliminating the dwells or dead spots which occur when the table is actuated according to conventional practice by means of a rack and pinion. As a consequence, a smooth, even, and uniform grinding of the work on the table is possible and the undesirable patterns produced on the work when the table is actuated by gear means is obviated. Also, it will be readily apparent that dust and grit on the drums 50 and 52 or the metal bands 60 and 62 will not have any adverse effect on the operation thereof. Nor will it tend to produce rapid wear on the parts as in the case when the table is actuated by interacting gear forms.

It also is a feature of this invention that the drive shaft 40 is rotatably driven by a handwheel 80 through a reduction gearing 82. To this end it will be observed that the forward terminal portion of drive shaft 40 extends into a relatively large recess or housing 84 at the outer end of the bore 42 and that an internal ring gear 86 is fixed on the end of the shaft which projects into the housing. The handwheel 80 is provided with a suitable shaft 88 which is journaled for rotation in bearings 90 and 92 carried by a mounting bracket 94 fastened on the saddle 16 in front of and closing the housing 84. The handwheel shaft 82 extends beyond the supporting bearings into the housing 84, and a pinion 96 on the shaft meshes with the ring gear 86. The teeth of both the ring gear 86 and pinion 96 preferably have a relatively fine pitch.

Several advantages are obtained by driving the shaft 40 through reduction gearing 82 and in positioning the reduction gearing at the front of the saddle 16. For one thing, the fine pitch of ring gear 86 and pinion 96 minimizes lost motion between the two shafts 40 and 88. In addition, the reduction gearing minimizes erratic movement of the table 26 and permits the operator of the machine to move the table at a smooth, uniform speed. Also, the fact that reduction gearing 82 is positioned at the front of the saddle 16, prevents dust and grit produced during use of the machine from having ready access thereto. It will be observed in this connection that the reduction gearing is entirely enclosed in the housing 84; and since it is disposed substantially forwardly of the table, it is in a peculiarly sheltered and protected position.

The use of reduction gearing in the manner disclosed in combination with the drum-and-band connection with the table 26 achieves remarkably smooth operation of the machine and eliminates substantially entirely the disadvantages inherent in the prior-art construction specifically referred to.

Having thus described the invention, I claim:

1. A surface grinder comprising a base, a saddle mounted for reciprocation on the base having a rear table supporting portion and a forward portion, a table reciprocably mounted on the rear supporting portion of the saddle for movement in a direction at right angles to the direction of travel of said saddle, means for actuating said table including a drive shaft journaled for rotation in the saddle and disposed substantially at right angles to the direction of travel of the table, said drive shaft disposed in the forward portion of the saddle and extending rearwardly under said table, a pair of drums fixed side by side on the rearward end of the drive shaft, a pair of tapes each fastened at one end thereof to a respective one of the drums, said tapes being wrapped around their respective drums in opposite directions, means fastening the distal ends of the tapes to opposite ends of the table, a housing at the front of the saddle receiving the forward end of said drive shaft, a manually operable rotatable shaft disposed forwardly of said drive shaft with the rearward end thereof extending into said housing, and reduction gearing having essentially fine meshing teeth disposed within and enclosed by said housing interconnecting said manually operable shaft and said drive shaft.

2. A surface grinder comprising a base, a saddle slidably mounted on the base, a table slidably mounted on the saddle for movement in a direction at right angles to the direction of travel of said saddle, means for actuating said table including a drive shaft journaled for rotation in the saddle and disposed substantially at right angles to the direction of travel of the table, said shaft extending forwardly of the table and the rearward end thereof being under said table, a pair of drums fixed side by side on the rearward end of the shaft, a pair of tapes each fastened at one end thereof to a respective one of the drums, said tapes being wrapped around their respective drums in opposite directions, means fastening the ends of the tapes to opposite ends of the table, at least one of said connecting means being adjustable to regulate the tension of the tapes, a manually operable rotatable shaft extending outwardly from said drive shaft, reduction gearing interconnecting said manually operable shaft and said drive shaft located sufficiently in front of the table to be relatively inaccessible to dust and grit created by use of the grinder, and a housing enclosing the proximate ends of said shafts and said reduction gearing to protect the same from dirt and grit that otherwise would gain access thereto.

3. A surface grinder including a reciprocable table, means for actuating said table including a rotatable drive shaft disposed substantially at right angles to the direction of travel of the table, said shaft extending forwardly of the table and the rearward end thereof being under said table, a pair of drums fixed side by side on the rearward end of the drive shaft, a pair of tapes each fastened at one end thereof to a respective one of the drums, said tapes being wrapped around their respective drums in opposite directions and fastened at opposite ends of the table, a manually operable rotatable shaft extending outwardly from said drive shaft, reduction gearing interconnecting said manually operable shaft and said drive shaft located a sufficient distance in front of the table to be relatively inaccessible to dirt and grit created by use of the grinder, and a housing entirely enclosing the proximate ends of said shafts and said reduction gearing to protect the same from dust and grit that otherwise would gain access thereto.

References Cited in the file of this patent

UNITED STATES PATENTS

| Number | Name | Date |
|---|---|---|
| 927,695 | Stake | July 13, 1909 |
| 956,444 | Stuck | Apr. 26, 1910 |
| 1,839,627 | Whitman | Jan. 5, 1932 |
| 2,069,138 | Feeney | Jan. 26, 1937 |
| 2,233,098 | Hodnett | Feb. 25, 1941 |
| 2,373,336 | Parkins | Apr. 10, 1945 |
| 2,631,500 | Wigton | Mar. 17, 1953 |

FOREIGN PATENTS

| Number | Country | Date |
|---|---|---|
| 166,615 | Austria | Aug. 25, 1950 |